(12) United States Patent
Hirata

(10) Patent No.: US 7,755,312 B2
(45) Date of Patent: Jul. 13, 2010

(54) MOTOR DRIVE DEVICE AND ELECTRIC EQUIPMENT USING THIS

(75) Inventor: Shigeru Hirata, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 323 days.

(21) Appl. No.: 12/063,697

(22) PCT Filed: Aug. 21, 2006

(86) PCT No.: PCT/JP2006/316309

§ 371 (c)(1),
(2), (4) Date: Feb. 13, 2008

(87) PCT Pub. No.: WO2007/026559

PCT Pub. Date: Mar. 8, 2007

(65) Prior Publication Data

US 2009/0261764 A1    Oct. 22, 2009

(30) Foreign Application Priority Data

Aug. 29, 2005  (JP) .............................. 2005-247730
May 8, 2006    (JP) .............................. 2006-128937

(51) Int. Cl.
    *H02P 6/08* (2006.01)
(52) U.S. Cl. .......................... 318/400.29; 318/400.13; 318/430; 318/473; 388/811; 417/423.7
(58) Field of Classification Search ............ 318/400.13, 318/400.29, 473, 430; 388/811; 317/423.7
    See application file for complete search history.

(56) References Cited

U.S. PATENT DOCUMENTS

| 6,448,752 | B1  |   | 9/2002  | Umemoto |         |
|-----------|-----|---|---------|---------|---------|
| 7,208,893 | B2  | * | 4/2007  | Furuki  | 318/400.01 |
| 7,239,200 | B2  | * | 7/2007  | Ishii et al. | 330/10 |
| 7,265,523 | B2  | * | 9/2007  | Dowlatabadi | 323/222 |
| 2004/0212356 | A1 | * | 10/2004 | Dowlatabadi | 323/282 |
| 2006/0132231 | A1 | * | 6/2006  | Ishii et al. | 330/10 |
| 2007/0090812 | A1 | * | 4/2007  | Dowlatabadi | 323/222 |
| 2008/0088268 | A1 | * | 4/2008  | Sakaguchi | 318/471 |
| 2008/0107408 | A1 | * | 5/2008  | Sugie   | 388/815 |
| 2009/0066280 | A1 | * | 3/2009  | Hayashi | 318/430 |
| 2009/0096402 | A1 | * | 4/2009  | Miyajima et al. | 318/473 |
| 2009/0153084 | A1 | * | 6/2009  | Mishima et al. | 318/400.13 |

(Continued)

FOREIGN PATENT DOCUMENTS

JP         02-94915          4/1990

(Continued)

*Primary Examiner*—Paul Ip
(74) *Attorney, Agent, or Firm*—Fish & Richardson P.C.

(57) ABSTRACT

A motor drive device comprising an H-bridge circuit having four switching elements connected in an H bridge form to a motor coil L, a control circuit for on-off controlling each switching element, and a PWM signal generating circuit for generating a PWM signal having a duty according to a ration between a power supply voltage Vcc and a control voltage Vref, wherein the control circuit is so constituted as to select a switching element to be turned on according to an operation mode control signal FIN, RIN and control its on-duty according to the PWM signal. This constitution can variably control easily and over a wide range a drive voltage applied to one end of the motor coil L according to an externally input control voltage Vref.

5 Claims, 8 Drawing Sheets

U.S. PATENT DOCUMENTS

| | | | | |
|---|---|---|---|---|
| 2009/0167219 A1* | 7/2009 | Imai et al. | | 318/400.11 |
| 2009/0184672 A1* | 7/2009 | Suzuki | | 318/400.13 |
| 2009/0212729 A1* | 8/2009 | Cook | | 318/474 |
| 2009/0261764 A1* | 10/2009 | Hirata | | 318/400.29 |
| 2009/0273738 A1* | 11/2009 | Fukumoto | | 349/70 |
| 2009/0284197 A1* | 11/2009 | Sugie | | 318/400.13 |

FOREIGN PATENT DOCUMENTS

| | | |
|---|---|---|
| JP | 10-201276 | 7/1998 |
| JP | 11-69875 | 3/1999 |
| JP | 3665565 | 7/2002 |
| JP | 2002-223563 | 8/2002 |
| JP | 2004-72657 | 3/2004 |

* cited by examiner

FIG. 4

| | (a) | (b) | (c) | (d) |
|---|---|---|---|---|
| FIN | H | L | H | L |
| RIN | L | H | H | L |
| QH1 | PWM | OFF | OFF | OFF |
| QH2 | OFF | PWM | OFF | OFF |
| QL1 | OFF | ON | ON | OFF |
| QL2 | ON | OFF | ON | OFF |
| MODE | (a) FORWARD ROTATION | (b) REVERSE ROTATION | (c) BRAKE | (d) IDLE RUNNING |

(a) FORWARD ROTATION (b) REVERSE ROTATION (c) BRAKE (d) IDLE RUNNING (a)

(b)

MOTOR DRIVE DEVICE AND ELECTRIC EQUIPMENT USING THIS

TECHNICAL FIELD

The present invention relates to a motor drive device for controlling the driving of a motor, and electric equipment using this.

BACKGROUND ART

In a motor drive device for controlling the driving of a motor, in order to set the rotation speed of a motor to a desired value, a drive voltage applied to one end of a motor coil (and thus a drive current flowing through the motor coil) needs to be controlled to be a desired value.

Accordingly, conventional motor drive devices have commonly adopted a configuration in which, as shown in FIG. 10, bipolar transistors Tr1 to Tr4 are used as switch elements in an H-bridge circuit, and means adapted to control base currents of upper-side transistors Tr1 and Tr2 according to a control voltage Vref externally fed as a drive voltage setting signal is provided (transistors Tra and Trb and constant current sources Ia and Ib), to thereby control a drive voltage applied to one end of a motor coil L (and thus a drive current flowing through the motor coil L) to be a desired value (so-called dropper-type regulator configuration). A control circuit CNT in this figure is means adapted to control the on-off state of the transistors Tr1 to Tr4 (i.e., the operation mode of the motor) according to the logics of externally fed operation mode control signals FIN and RIN (binary signals).

In the motor drive device configured as described above, while the upper-side transistor Tr1 (Tr2) is kept on, a drive voltage (a voltage approximately as high as the control voltage Vref) obtained by raising the control voltage Vref only by the value of 1Vf of the transistor Tra (Trb) and then dropping the control voltage Vref only by the value of 1Vf of the transistor Tr1 (Tr2) is applied to the one end of the motor coil L.

As other conventional arts related to the present invention, there have been disclosed and proposed: a motor drive control system in which field effect transistors are used as switch elements in an H-bridge circuit and gate voltages of the transistors are controlled by pulse width modulation control (hereinafter referred to as PWM (pulse width modulation) control) (see Patent Publication 1); and a technology in which, with respect to a triangular wave generating circuit that outputs the charge-discharge voltage of a capacitor as a triangular wave, the frequency of the outputted triangular wave is maintained to a predetermined frequency by such control that the amplitude of the triangular wave is reduced with reduction of the power source voltage, and further, the value of a current for charging and discharging the capacitor is reduced according to this amplitude (see Patent Publication 2 filed by the applicant of the present application).

Patent Publication 1 JP-B-3665565
Patent Publication 2 JP-A-2002-223563

DISCLOSURE OF THE INVENTION

Problems to be Solved by the Invention

It is true that, with a motor drive device having the conventional configuration shown in FIG. 10, it is possible to control the drive voltage applied to one end of a motor coil L (and thus the current voltage flowing through the motor coil L) to be a desired value according to the control voltage Vref regardless of the power source voltage Vcc by appropriately generating the control voltage Vref by use of a resistive divider circuit or the like provided outside the device.

However, in the conventional motor drive device described above, for the purpose of ensuring proper operation of the transistor Tra (Trb), the control voltage Vref can be set only up to a voltage value given by subtracting the value of 1Vf of the transistor Tra (Trb) from the power source voltage Vcc (in practice, an even lower voltage determined additionally with even the voltage drop occurring at a constant current source Ia (Ib) taken into consideration). As a result, the drive voltage that can be applied to the one end of the motor coil L is a voltage lower than the power source voltage Vcc at least by the value of 1Vf of the transistor Tra (Trb), and this prevents an effective use of the power source voltage range.

In addition, in the conventional motor drive device described above, since the bipolar transistors Tr1 to Tr4 are used as the switch elements of the H-bridge circuit, the response of the switch elements to on-off control is not necessarily fast.

Patent Publication 1 discloses only a technology in which the operation mode of a motor is selectively set by PWM driving a switch element of an H-bridge circuit according to a drive current flowing through a motor coil, but does not disclose anything with respect to a technology in which the drive voltage applied to one end of a motor coil is set to a desired value according to an externally applied control voltage.

The conventional technology of Patent Publication 2 relates to a switching regulator that is PWM-driven by use of a triangular wave generated by a triangular wave generating circuit, and its main object is limited to providing a switching regulator that is capable of securely performing PWM driving according to variation in the output voltage by preventing PWM driving capability from deteriorating even when the power source voltage is lowered, and by ensuring a predetermined duty ratio even when the power source voltage is lowered. Therefore, the conventional technology of Patent Publication 2 offers no solution to the above described problems.

The object of the present invention is to provide a motor drive device that is capable of variably controlling the drive voltage applied to one end of a motor coil easily and in a wide range according to an externally fed control voltage, and electric equipment using this.

Means for Solving the Problem

To achieve the above object, according to one aspect of the present invention, a motor drive device includes: an H-bridge circuit having four switch elements connected in an H bridge to a motor coil provided in a motor; a control circuit for on-off controlling the switch elements; and a PWM signal generating circuit for generating a PWM signal having a duty commensurate with a ratio between a power source voltage applied via the H-bridge circuit to one or an other end of the motor coil and a control voltage fed from outside the device. Here, the control circuit selects a switch element to be turned on according to an operation mode control signal fed from outside the device, and controls an on-duty of the switch element according to the PWM signal (first configuration).

According to the present invention, it is preferable that, in the motor drive device having the first configuration, the PWM signal generating circuit include: a first voltage divider for dividing the power source voltage by a predetermined ratio to generate a first division voltage; a second voltage divider for dividing the control voltage by a predetermined ratio to generate a second division voltage; an oscillator for generating an oscillation voltage having a constant frequency and a sawtooth or a triangular waveform an amplitude of which varies according to the first division voltage; and a PWM comparator an output logic of which changes according to which of the second division voltage and the oscillation voltage is higher, and that the PWM signal generating circuit feed an output signal of the PWM comparator to the control circuit as the PWM signal (second configuration).

According to the present invention, it is preferable that, in the motor drive device having the second configuration, the oscillator include: a capacitor a terminal voltage of which is derived as the oscillation voltage; a charge current supply portion adapted to supply the capacitor with a charge current that is in proportion to the first division voltage; a first comparator an output logic of which changes according to which of the first division voltage and the terminal voltage of the capacitor is higher; a second comparator an output logic of which changes according to which of the terminal voltage of the capacitor and a predetermined reference voltage is higher; an RS flip-flop to which an output signal from the first comparator is set-inputted and an output signal from the second comparator is reset-inputted; and a discharge switch that is connected between one end of the capacitor and a ground terminal, and that is on-off controlled according to an output signal from the RS flip-flop (third configuration).

According to the present invention, it is preferable that, in the motor drive device having the second configuration, the oscillator include a counter for counting clock signals and a digital-analog converter for converting a value counted by the counter into an analog voltage, that the oscillator output as the oscillation voltage an output of the digital-analog converter, and that, to the digital-analog converter, the first division voltage be applied as a positive power source voltage and a predetermined reference voltage be applied as a negative power source voltage (fourth configuration).

According to another aspect of the present invention, electric equipment includes a motor and a motor drive device for controlling driving of the motor. Here, the electric equipment has, as the motor drive device, a motor drive device having any one of the first to the fourth configurations described above (fifth configuration).

ADVANTAGES OF THE INVENTION

According to the present invention, the drive voltage applied to one end of a motor coil can be variably controlled easily and in a wide range according to an externally fed control voltage.

BRIEF DESCRIPTION OF DRAWINGS

FIG. 4 is a diagram illustrating gate-signal generating operation performed according to operation mode control signals FIN and RIN;

Figure 1:
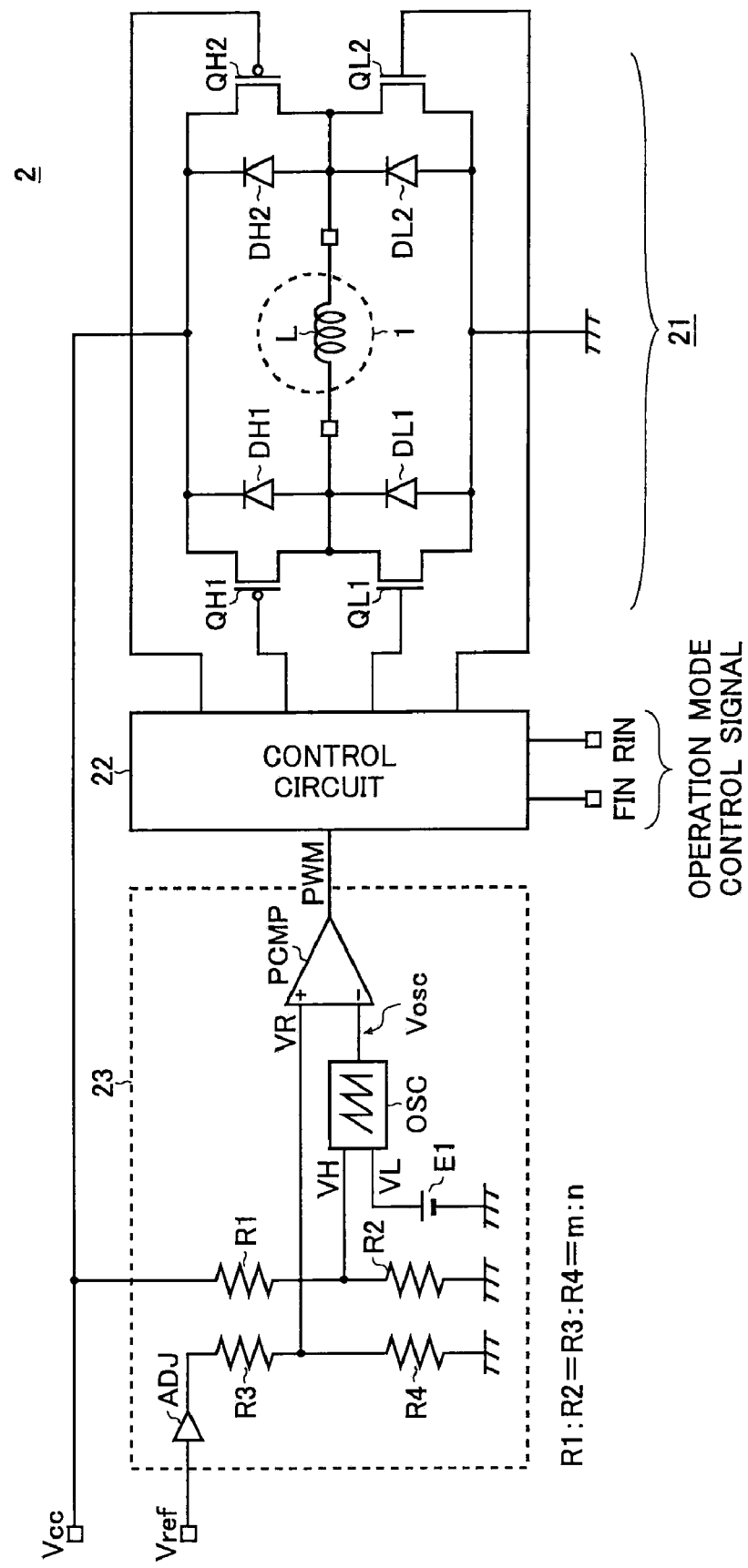
FIG. 1 is a block diagram showing electric equipment embodying the present invention provided with a motor drive device of the present invention.

LIST OF REFERENCE SYMBOLS 1 motor
2 motor drive device
21 H-bridge circuit
22 control circuit
22a bootstrap output stage
23 PWM signal generating circuit
24 charge pump circuit
QH1, QH2 P-channel field effect transistors (upper-side switch elements)
QH1', QH2' N-channel field effect transistors (upper-side switch elements)
QL1, QL2 N-channel field effect transistors (lower-side switch elements)
DH1, DH2, DL1, DL2 diodes
D1', D2' diodes
C1', C2' capacitors
L motor coil
R1 to R4 resistors
E1 direct current voltage source
PCMP PWM comparator
ADJ impedance converter
OSC oscillator
C1 capacitor
CMP1, CMP2 comparators
VIC voltage-current converter
I1 variable current source
FF RS flip-flop
DAC digital-analog converter
CT counter

BEST MODE FOR CARRYING OUT THE INVENTION

FIG. 1 is a diagram (partly including circuit elements) showing electric equipment embodying the present invention provided with a motor drive device of the present invention.

As shown in the figure, the electric equipment of this embodiment includes a motor 1 and a motor drive device 2 for controlling the driving of the motor 1.

The motor 1 is a single-phase DC motor that rotates in a direction corresponding to the current passed through a motor coil L, and whose operation is switched among four different operation modes (forward rotation, reverse rotation, brake, and idle-running modes) by the motor drive device 2.

Examples of the mechanism used in electric equipment provided with the reversible motor 1 are a tray opening-closing mechanism of a tray-type CD player, a cassette-ejecting mechanism of a video deck, an automatic paper-cutting mechanism of a printer, a focusing mechanism of a camera, and a louver opening-closing mechanism of an air conditioner, and thus the reversible motor 1 has an extremely wide range of application.

The motor drive device 2 includes an H-bridge circuit 21, a control circuit 22, and a PWM signal generating circuit 23.

The H-bridge circuit 21 includes four switch elements (P-channel field effect transistors QH1 and QH2 and N-channel field effect transistors QL1 and QL2) connected in an H bridge to a motor coil L (a reactance load) provided in the motor 1.

A specific description will now be given of the internal configuration of the H-bridge circuit 21.

The sources of the transistors QH1 and QH2 functioning as upper-side switch elements are both connected to a power source input terminal to which a power source voltage Vcc is applied. The sources of the transistors QL1 and QL2 functioning as lower-side switch elements are both connected to a ground terminal. The drains of the transistors QH1 and QL1 are connected to each other, and their connection node is connected to a first output terminal to which one end of the motor coil L is connected. The drains of the transistors QH2 and QL2 are connected to each other, and their connection node is connected to a second output terminal to which the other end of the motor coil L is connected. The gates of the transistors QH1, QH2, QL1, and QL2 are all connected to a gate signal output terminal of the control circuit 22.

As shown in FIG. 1, diodes DH1, DH2, DL1, and DL2 are connected in parallel in the direction shown in the figure to the transistors QH1, QH2, QL1, and QL2, respectively, and function as back electromotive force absorbing elements for the motor coil L. In the case where the transistors QH1, QH2, QL1, and QL2 are each accompanied by a parasitic diode, the parasitic diodes may be used as the back electromotive force absorbing elements.

The control circuit 22 predominantly controls the transistors QH1, QH2, QL1, and QL2 and is means adapted to select a transistor to be turned on according to the operation mode control signals FIN and RIN fed from outside the device, and also to generate, for the purpose of controlling the on-duty of the selected transistor according to a PWM signal fed from the PWM signal generating circuit 23, gate signals of the transistors QH1, QH2, QL1, and QL2 according to the operation signals FIN and RIN and the PWM signal. A detailed description will be given later of the specific operation of the control circuit 22.

The PWM signal generating circuit 23 is means adapted to generate a PWM signal having a duty commensurate with the ratio between the power source voltage Vcc applied to one or the other end of the motor coil L via the H-bridge circuit 21 and a control voltage Vref fed from outside the device.

A specific description will now be given of the inner configuration of the PWM signal generation circuit 23.

As shown in FIG. 1, the PWM signal generating circuit 23 includes resistors R1 to R4, an impedance converter ADJ, a direct current voltage source E1, an oscillator OSC, and a PWM comparator PCMP.

The resistors R1 and R2 are connected in series to each other between a power source input terminal and a ground terminal, and their connection node is connected to one input terminal (an upper-limit setting terminal) of the oscillator OSC. The resistance ratio between the resistors R1 and R2 is m:n. The resistors R1 and R2 function as a first voltage divider for dividing the power source voltage Vcc by a predetermined ratio α (=n/(m+n)) to generate a first division voltage VH (=α×Vcc).

The direct current voltage source E1 is means adapted to generate a predetermined reference voltage VL. The positive terminal of the direct current voltage source E1 is connected to the other input terminal (a lower-limit setting terminal) of the oscillator OSC, and the negative terminal of the direct current voltage source E1 is connected to a ground terminal.

The oscillator OSC is means adapted to generate an oscillation voltage Vosc having a constant frequency and a sawtooth or a triangular waveform whose amplitude varies according to the first division voltage VH, and the output terminal of the oscillator OSC is connected to an inversion terminal (−) of the PWM comparator PCMP. A detailed description will later be given of the specific configuration and operation of the oscillator OSC.

The resistors R3 and R4 are connected to each other in series between a control voltage input terminal and a ground terminal via the impedance converter ADJ, and their connection node is connected to a non-inversion terminal (+) of the PWM comparator PCMP. The resistance ratio between the resistors R3 and R4 is m:n. The resistors R3 and R4 function as a second voltage divider for dividing the control voltage Vref by a predetermined ratio α (=n/(m+n)) to generate a second division voltage VR (=α×Vref).

The impedance converter ADJ is means adapted to match the impedance between the input and output thereof (i.e., buffer means).

The PWM comparator PCMP is comparison means whose output logic changes according to which of the second division voltage VR and the oscillation voltage Vosc is higher, and its output signal is fed as a PWM signal to the control circuit 22. The PWM signal is a binary signal that is high level when the second division voltage VR is higher than the oscillation voltage Vosc, and that is low level when the second division voltage VR is lower than the oscillation voltage Vosc.

Next, a detailed description will be given of the specific configuration and operation of the oscillator OSC, with reference to FIGS. 2 and 3.

Figure 2:
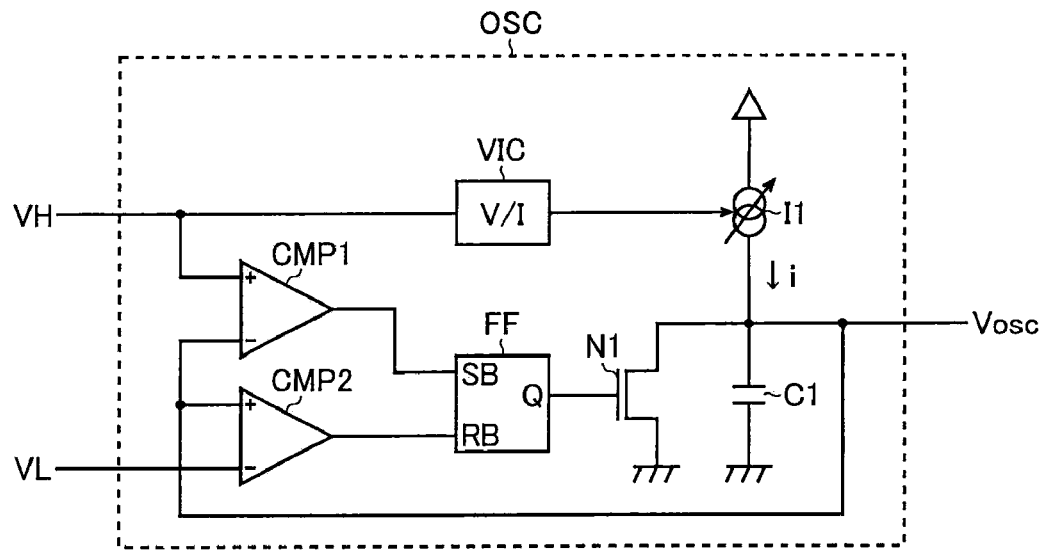
FIG. 2 is a block diagram showing an example of the configuration of an oscillator OSC.
Figure 3:
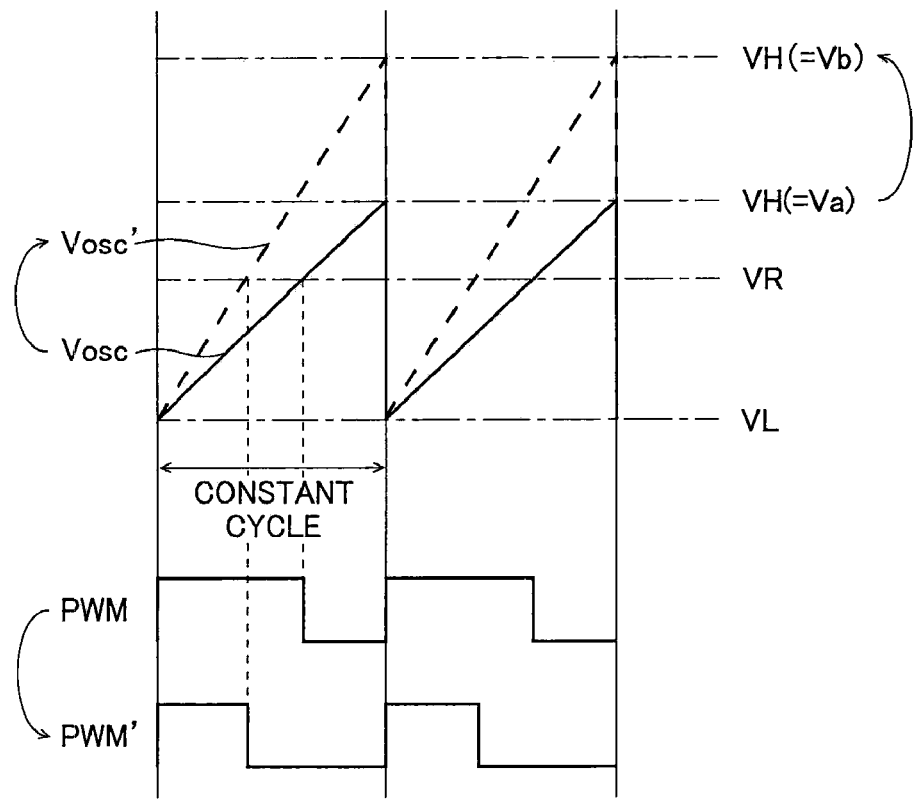
FIG. 3 is a waveform chart showing an example of the operation of the oscillator OSC.

FIG. 2 is a block diagram (partly including circuit elements) showing an example of the configuration of the oscillator OSC, and FIG. 3 is a waveform chart showing an example of the operation of the oscillator OSC.

A solid line marked with "Vosc" in the upper part of FIG. 3 represents the oscillation voltage Vosc in the case where a voltage Va is fed as the first division voltage VH, and a broken line marked with "Vosc'" in the upper part of FIG. 3 represents the oscillation voltage Vosc in the case where the voltage Vb (>Va) is fed as the first division voltage VH. In the lower part of FIG. 3, the PWM signals generated in the above cases are marked with "PWM" and "PWM'", respectively.

As shown in FIG. 2, the oscillator OSC of this embodiment includes a capacitor C1, a voltage-current converter VIC, a variable current source I1, a first comparator CMP1, a second comparator CMP2, an RS flip-flop FF, and an N-channel field effect transistor N1.

One terminal of the capacitor C1 is connected to an output terminal of the variable current source I1, and is also connected as an output terminal of the oscillator OSC to an inversion input terminal (−) of the PWM comparator PCMP. That is, in the oscillator OSC of this embodiment, the terminal voltage of the capacitor C1 is derived as the oscillation voltage Vosc. The other terminal of the capacitor C1 is grounded.

The voltage-current converter VIC and the variable current source I1 are means adapted to supply the capacitor C1 with a charge current "i" that is in proportion to the first division voltage VH.

The first comparator CMP1 is comparison means whose output logic changes according to which of the first division voltage VH and the terminal voltage of the capacitor C1 (the oscillation voltage Vosc) is higher. The output signal of the first comparator CMP1 is a binary signal that is high level when the first division voltage VH is higher than the terminal voltage of the capacitor C1, and that is low level when the first division voltage VH is lower than the terminal voltage of the capacitor C.

The second comparator CMP2 is comparison means whose output logic changes according to which of the terminal voltage of the capacitor C1 (the oscillation voltage Vosc) and the predetermined reference voltage VL is higher. The output signal of the second comparator CMP2 is a binary signal that is high level when the terminal voltage of the capacitor C1 is higher than the predetermined reference voltage VL, and that is low level when the terminal voltage of the capacitor C1 is lower than the predetermined reference voltage VL.

The RS flip-flop FF is means adapted to output from its output terminal (Q) the gate signal of the transistor N1 according to the output signal of the first comparator CMP1 fed to its inversion-set terminal (SB) and the output signal of the second comparator CMP2 fed to its inversion-reset terminal (RB). More specifically, the output logic of the RS flip-flop FF continues to change in such a manner that it becomes a high level when the oscillation voltage Vosc reaches the first division voltage VH, and then, when the oscillation voltage Vosc reaches the reference voltage VL, it returns to a low level.

The transistor N1 is connected between one end of the capacitor C1 and a ground terminal, and functions as a discharge switch that is on-off controlled according to the output signal of the RS flip-flop FF. More specifically, the on-off state of the transistor N1 continues to change in such a manner that the transistor N1 is turned on when the oscillation voltage Vosc reaches the first division voltage VH, and then when the oscillation voltage Vosc reaches the reference voltage VL, it is turned off.

Through the charge-discharge control described above, as shown in the upper part of FIG. 3, the upper limit of the oscillation voltage Vosc is variably set according to the first division voltage VH, and the lower limit of the oscillation voltage Vosc is fixedly set according to the predetermined reference voltage VL.

As mentioned above, the current value (the charging speed of the capacitor C1) of the charge current "i" of the capacitor C1 is increased or decreased in proportion to the first division voltage VH. More specifically, with the oscillator OSC of this embodiment, the higher the first division voltage VH (and thus the power source voltage Vcc) is, the higher the charging speed of the capacitor C1 is; and the lower the first division voltage VH is, the lower the charging speed of the capacitor C1 is.

Through the charge current control described above, the oscillating cycle (the oscillating frequency) of the oscillator OSC is kept constant regardless of the first division voltage VH (and thus the power source voltage Vcc).

As already mentioned, in the PWM signal generating circuit 23 of this embodiment, the voltage division ratios of the first and second voltage dividers are set to the same value ($\alpha = n/(m+n)$).

Therefore, at the PWM comparator PCMP, by comparing the second division voltage VR and the oscillation voltage Vosc, a PWM signal having a duty commensurate with the ratio between the first division voltage VH (the power source voltage Vcc) and the second division voltage VR (the control voltage Vref) can be obtained, and thus the drive voltage applied to the one end of the motor coil L can be variably controlled easily and in a wide range according to a control voltage freely fed by the user (see the lower part of FIG. 3).

In generating the control voltage Vref, the correlationship with respect to the power source voltage Vcc (i.e., the duty of the PWM signal) does not need to be taken into particular consideration, and a voltage having the same value as the drive voltage to be applied to the one end of the motor coil L may be generated as necessary by use of a resistance divider circuit or the like provided outside the device.

For example, in the case where the drive voltage that should be applied to the one end of the motor coil is 3 V, a voltage of 3 V, as is desired, may be applied as the control voltage Vref, regardless of whether the power source voltage Vcc is 5 V or 12 V.

In the case where the power source voltage Vcc itself should be applied to the one end of the motor coil L, the control voltage input terminal may be short-circuited to the power source input terminal.

Next, a detailed description will be given of the control operation of the H-bridge circuit 21 by the control circuit 22, with reference to FIGS. 4 and 5.

Figure 5:
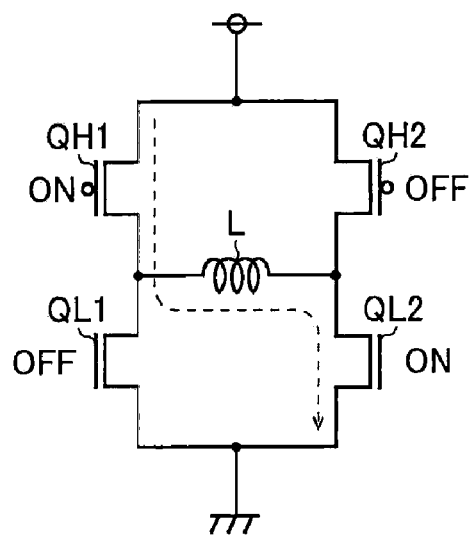
FIG. 5 shows views illustrating drive current paths in different operation modes (forward rotation, reverse rotation, brake, and idle-running modes)
Figure 5:
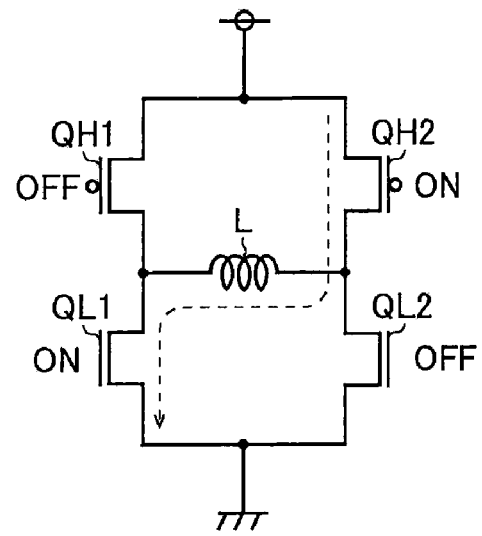
Figure 5:
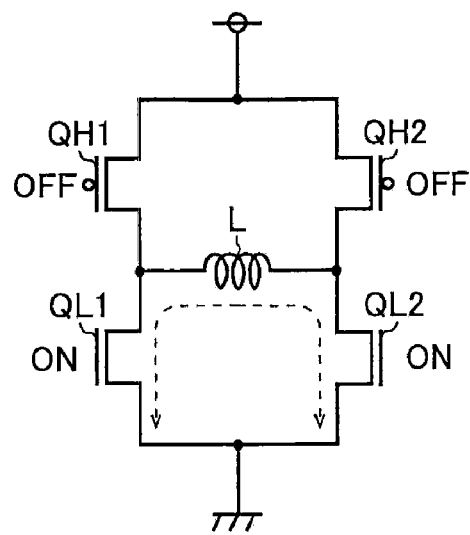
Figure 5:
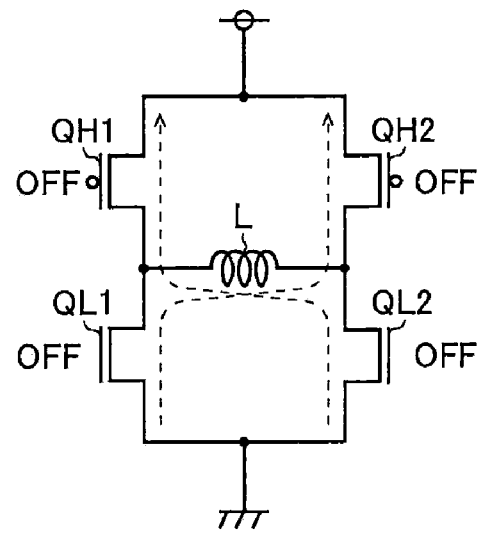

FIG. 4 is a diagram illustrating gate-signal generating operation according to the operation mode control signals FIN and RIN, and FIG. 5 shows views illustrating the drive current paths in different operation modes (forward rotation, reverse rotation, brake, and idle-running modes).

In FIG. 4, at the left end side thereof, the symbols "FIN" and "RIN" denote the logic states of the operation mode control signals FIN and RIN fed from outside the device, respectively, and the symbols "QH1", "QH2", "QL1", and "QL2" denote the gate-signal logic states of the transistors QH1, QH2, QL1, and QL2 provided in the H-bridge circuit 21, respectively. The symbol "MODE" denotes the operation mode of the motor 1.

In the case where the operation mode control signals FIN and RIN are high level and low level, respectively, the control circuit 22 generates the gate signals of the transistors so that the transistors QH1 and QL2 are turned on and the transistors QH2 and QL1 are turned off to switch the motor 1 to the "forward rotation mode". By such generation of the gate signals, a drive current is passed via the H-bridge circuit 21 through the motor coil L provided in the motor 1 along the path shown in FIG. 5(a), and the motor 1 is driven to rotate forward.

On the other hand, in the case where the operation mode control signals FIN and RIN are low level and high level, respectively, the control circuit 22 generates the gate signals of the transistors so that the transistors QH2 and QL1 are turned on and the transistors QH1 and QL2 are turned off to switch the motor 1 to the "reverse rotation mode". With such generation of the gate signals, a drive current is passed via the H-bridge circuit 21 through the motor coil L provided in the motor 1 along the path shown in FIG. 5(b), and the motor 1 is driven to rotate reversely.

In the cases where the two operation modes described above are selected, the on duties of the upper-side transistors QH1 and QH2 are controlled according to a PWM signal fed from the PWM signal generating circuit 23. With such PWM driving, the drive current is repeatedly charged into and discharged from the motor coil L, and thereby the drive voltage of the motor coil L is controlled.

Therefore, with the motor drive device of this embodiment, it is possible, regardless of the power source voltage Vcc, to control the drive current applied to the one end of the motor coil L (and thus the drive current flowing through the motor coil L) to be a desired value according to the control voltage Vref set by the user.

In the case where the operation mode control signals FIN and RIN are both high level, the control circuit 22 generates the gate signals of the transistors so that the transistors QL1 and QL2 are turned on and the transistors QH1 and QH2 are turned off to switch the motor 1 to the "brake mode". With such generation of the gate signals, a drive current is diverted from the motor coil L provided in the motor 1 via the H-bridge circuit 21 to a ground terminal along the path shown in FIG. 5(c), and the motor 1 is braked.

In the case where the operation mode control signals FIN and RIN are both low level, the control circuit 22 generates the gate signals of the transistors so that the transistors QL1, QL2, QH1, and QH2 are all turned off to switch the motor 1 to the "idle-running mode". With such generation of the gate signals, a current flows, according to the back electromotive force of the motor coil L provided in the motor 1, through the H-bridge circuit 21 along the path shown in FIG. 5(d), and the motor 1 is made to run idle.

As mentioned above, with the motor drive device of this embodiment, the drive voltage applied to the one end of the motor coil L (and thus the drive current flowing through the motor coil L) can be variably controlled, easily and in a wide range, according to the externally fed control voltage Vref, and thus an effective use can be made of the power source voltage range of the device.

Furthermore, with the configuration in which the drive voltage applied to the one end of the motor coil L is controlled to be a desired value by PWM driving the switch elements of the H-bridge circuit 21, a regenerative current from the motor 1 can be used, and thus it is possible to shut off the power supply during the off period to make the device power-saving.

Moreover, with the motor drive device of this embodiment in which field effect transistors are used as the switch elements of the H-bridge circuit 21, the response of the switch elements to the on-off control can be enhanced as compared with that in the conventional configuration in which bipolar transistors are used. It is possible, however, to exploit the above described advantages of the present invention even if bipolar transistors are used as the switch elements, and thus, use of field effect transistors is not always essential to practice the present invention.

In the embodiment described above, it is assumed that a single-phase DC motor is provided and driven, but this is not meant to limit the configuration of the present invention in any manner, and the present invention can be widely applied to motor drive devices for driving other types of motors (e.g. voice-coil motors and stepping motors).

The present invention may be carried out in any manner other than specifically described above as an embodiment, and many modifications and variations are possible within the scope and spirit of the present invention.

For example, in the embodiment described above, it is assumed that the upper-side transistors QH1 and QH2 of all the switch elements provided in the H-bridge circuit 21 are PWM driven, but this is not meant to limit the configuration of the present invention in any manner, and the lower-side transistors QL1 and QL2 may be PWM driven.

Figure 6:
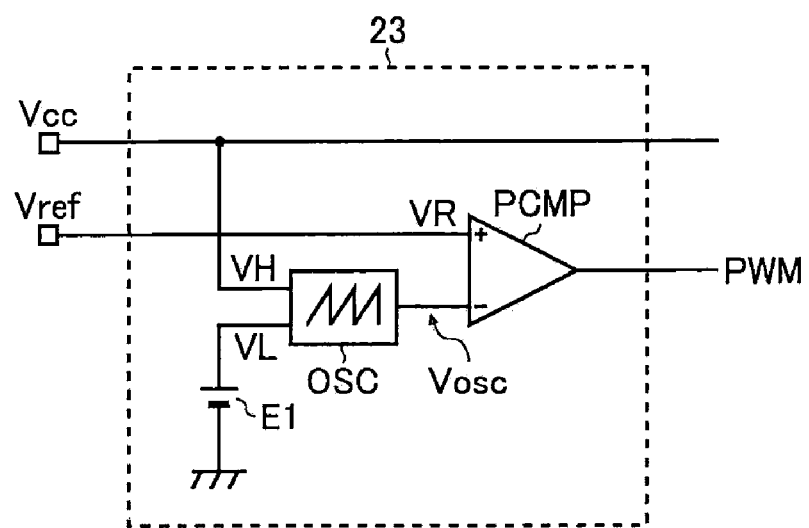
FIG. 6 is a circuit diagram showing a modified example of a PWM signal generating circuit 23.

In the embodiment described above, it is assumed that the power source voltage Vcc and the control voltage Vref are divided to generate the first division voltage VH and the second division voltage VR, respectively, and the PWM signal is generated by use of these division voltages, but this is not meant to limit the configuration of the present invention in any manner; as long as the PWM comparator PCMP is used that is capable of operating at full swing between a power source and a GND, instead of using the first division voltage VH and the second division voltage VR, the power source voltage Vcc and the control voltage Vref may be directly used as shown in FIG. 6. The impedance converter ADJ shown in FIG. 1 is not an essential component but may be omitted as shown in FIG. 6.

Figure 7:
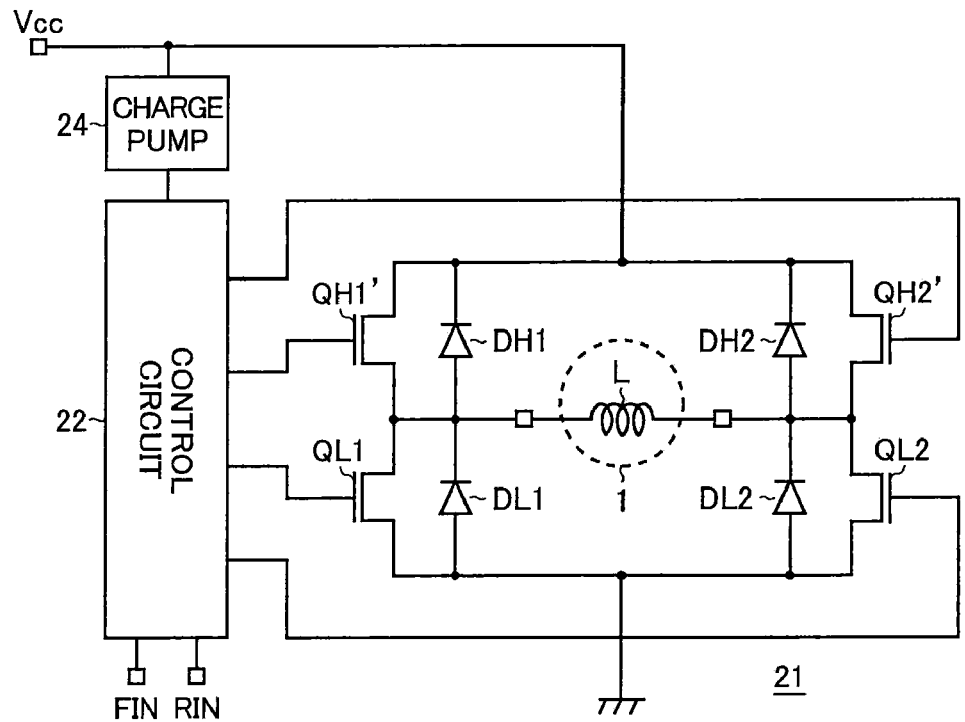
FIG. 7 is a circuit diagram showing a modified example of an H-bridge circuit 21.
Figure 7:
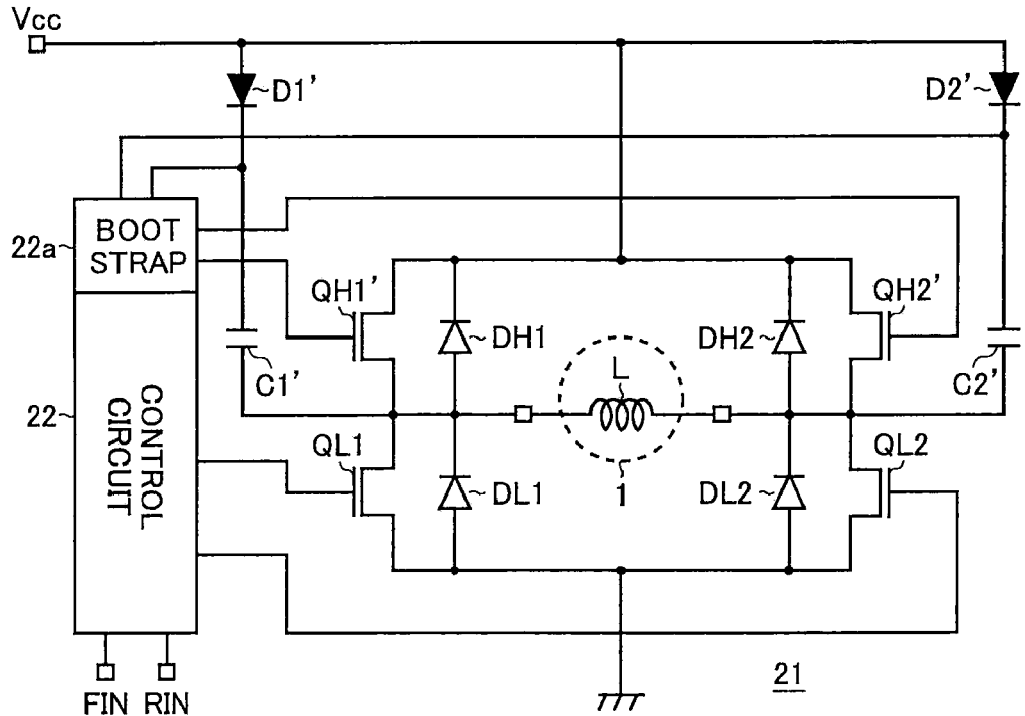

In the embodiment described above, it is assumed that P-channel field effect transistors QH1 and QH2 are used as the upper-side switch elements in the H-bridge circuit 21, but this is not meant to limit the configuration of the present invention in any manner, and as shown in FIGS. 7(a) and 7(b), N-channel field effect transistors QH1' and QH2' may be used as the upper-side switch elements. In this case, as means adapted to generate the gate voltages of the transistors QH1' and QH2', a charge pump circuit 24 for stepping up the power source voltage Vcc may be used, or, as shown in FIG. 7(b), there may be used a bootstrap output stage 22a for bootstrapping the gate voltages of the transistors QH1' and QH2' with respect to their respective source voltages.

In the embodiment described above, it is assumed that the oscillation voltage Vosc is generated in an analog fashion in the oscillator OSC, but this is not meant to limit the configuration of the present invention in any manner, and the oscillation voltage Vosc may be generated in a digital fashion.

Figure 8:
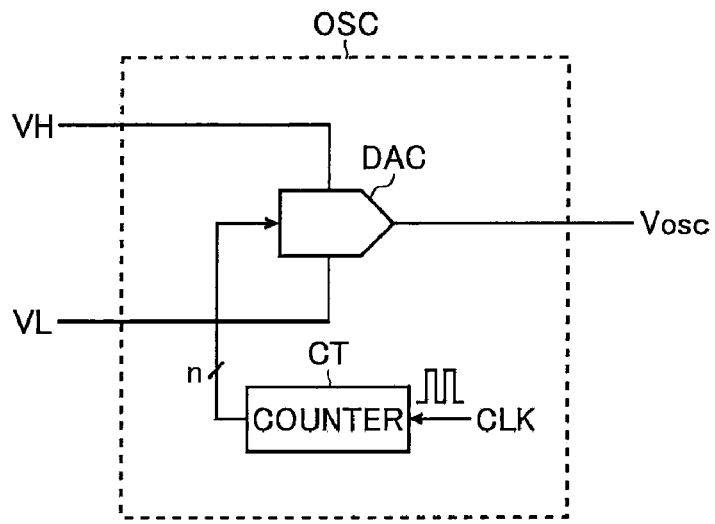
FIG. 8 is a block diagram showing a modified example of the oscillator OSC.
Figure 9:
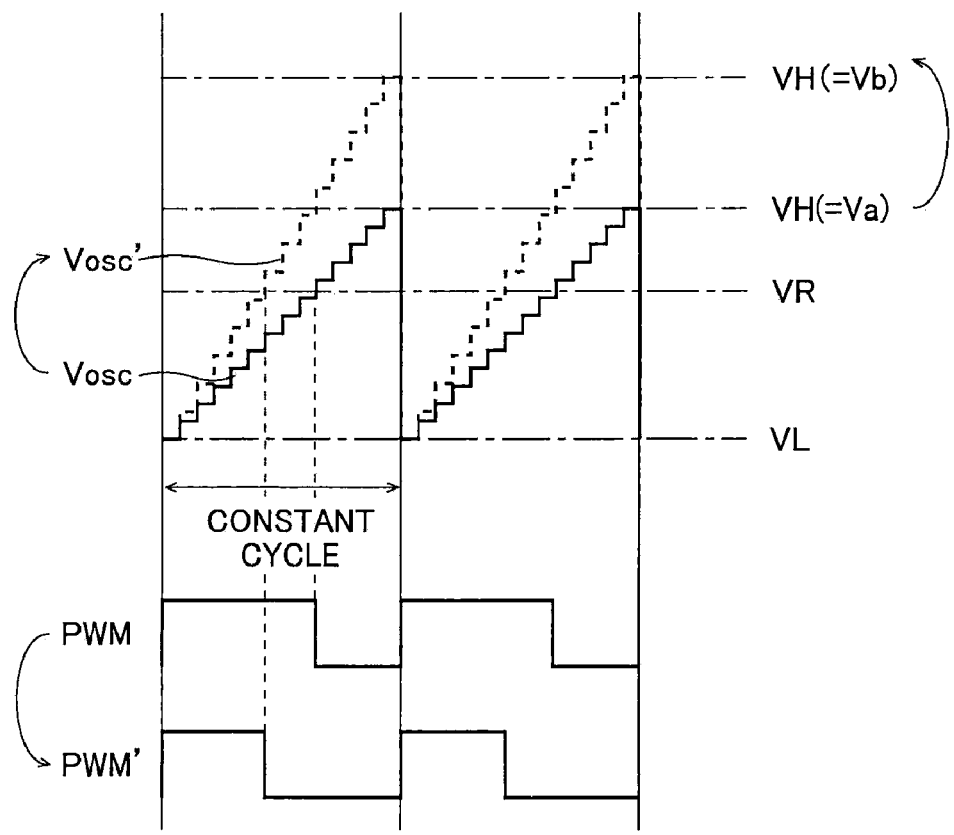
FIG. 9 is a waveform chart showing an example of the operation of the oscillator OSC.
Figure 10:
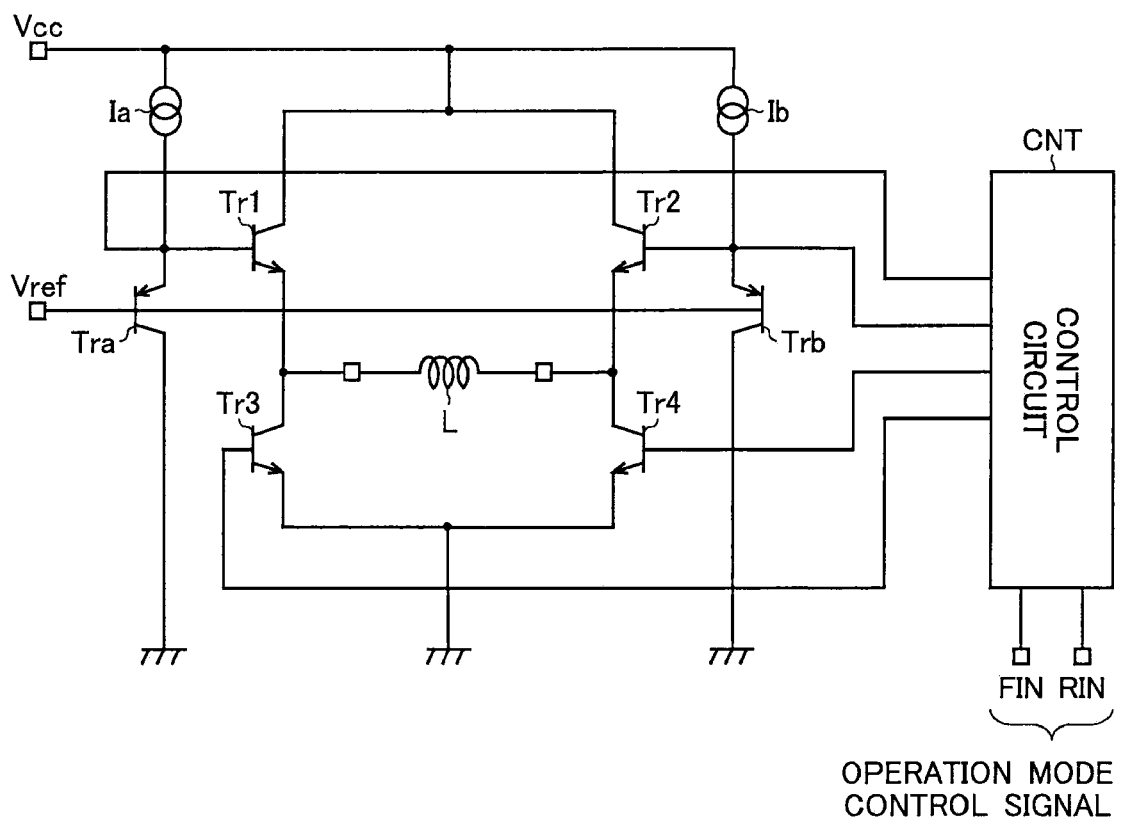
FIG. 10 is a circuit diagram showing a conventional motor drive device.

FIG. 8 is a block diagram showing a modified example of the oscillator OSC, and FIG. 9 is a waveform chart showing an example of the operation of the oscillator OSC.

A solid line marked with "Vosc" in the upper part of FIG. 9 represents the oscillation voltage Vosc in the case where a voltage Va is fed as the first division voltage VH, and a broken line marked with "Vosc'" in the upper part of FIG. 9 represents the oscillation voltage Vosc in the case where the voltage Vb (>Va) is fed as the first division voltage VH. In the lower part of FIG. 9, the PWM signals generated in the above cases are marked with "PWM" and "PWM'" respectively.

As shown in FIG. 8, the oscillator OSC of this modified example includes a free-running counter CT for counting clock signals CLK and an n-bit digital-analog converter DAC (e.g., a 6-bit R-2R circuit) for converting the value counted by the counter CT into an analog voltage, and the oscillator OSC feeds the output of the digital-analog converter DAC as the oscillation voltage Vosc to the following PWM comparator PCMP.

To the digital-analog converter DAC, the first division voltage VH is applied as a positive power source voltage (corresponding to a set upper-limit voltage of the oscillation voltage Vosc), and as a negative power source voltage (corresponding to a set lower-limit voltage of the oscillation voltage Vosc), the reference voltage VL is applied.

When the counter CT counts, the oscillation voltage Vosc generated in the oscillator OSC configured as described above starts to be stepped up in "n" steps from the level of the reference voltage VL to the level of the first division voltage VH, and then, next time the counter CT counts, the oscillation voltage Vosc is pulled down back to the level of the reference voltage VL. This state change is repeated, and thus the oscillation voltage Vosc has a sawtooth waveform.

That is, the upper limit value of the oscillation voltage Vosc is variably set according to the first division voltage VH, and the lower limit value of the oscillation voltage Vosc is fixedly set according to the reference voltage VL. As shown in the lower part of FIG. 9, being determined according to the oscillating frequency of the clock signal CLK and the bit resolution of the digital-analog converter DAC, the oscillating cycle (the oscillating frequency) of the oscillation voltage Vosc is maintained constant regardless of the first division voltage VH (and thus the power source voltage Vcc).

Thus, with the oscillator OSC of this modified example, it is possible to control the oscillating cycle of the oscillation voltage Vosc more easily and more accurately than with the one configured as shown in FIG. 2. In particular, in controlling the driving of a plurality of motors, a configuration where the clock signal CLK is externally fed makes it easy to synchronize the plurality of motors.

Another possible configuration is one in which the PWM signal is generated by simply comparing the oscillation voltage Vosc having a predetermined amplitude regardless of the power source voltage Vcc and the externally fed control voltage Vref to be used to PWM drive the switch elements, but if this configuration is adopted, the user himself/herself must calculate beforehand the duty of the PWM signal, taking into consideration the correlationship between the power source voltage Vcc and a desired drive voltage, and then input the control voltage Vref commensurate with the calculation result. In contrast, with the configuration of the embodiment described above, the user has only to input the control voltage Vref having the same value as a desired drive voltage. Thus, in terms of enhanced user friendliness, it is preferable to adopt the configuration of the above described embodiment.

Still another possible configuration is one in which the operation mode control signals FIN and RIN themselves are PWM controlled and used to PWM control the switch elements, but if this configuration is adopted, generation means for generating the operation mode control signals FIN and RIN needs to be replaced (e.g., updating of microcomputer firmware), and this consequently forces the user to change the system drastically. In contrast, with the configuration of the above described embodiment, the user has only to replace the motor drive device with that of this embodiment, and as for the operation mode control signals FIN and RIN, the user has only to input such signals as are conventionally used. Therefore, in terms of avoiding a drastic change of the system, it is preferable that the configuration of the above described embodiment be adopted.

INDUSTRIAL APPLICABILITY

The present invention offers a technology useful for setting a rotation speed of a motor easily and in a wide range in a motor drive device for controlling the driving of a motor and electric equipment using this.

The invention claimed is:

1. A motor drive device, comprising:
   an H-bridge circuit having four switch elements connected in an H-bridge to a motor coil in a motor;
   a control circuit for on-off control of the switch elements; and
   a PWM signal generating circuit for generating a PWM signal having a duty commensurate with a ratio between a power source voltage applied via the H-bridge circuit to one or another end of the motor coil and a control voltage fed from outside the device,
   wherein the control circuit is arranged to select a switch element to be turned on according to an operation mode control signal fed from outside the device, and to control an on-duty of the switch element according to the PWM signal.

2. The motor drive device of claim 1, wherein the PWM signal generating circuit includes:
   a first voltage divider for dividing the power source voltage by a predetermined ratio to generate a first division voltage;
   a second voltage divider for dividing the control voltage by a predetermined ratio to generate a second division voltage;
   an oscillator for generating an oscillation voltage having a constant frequency and a sawtooth or a triangular waveform having an amplitude that varies according to the first division voltage; and
   a PWM comparator having an output logic that changes according to which of the second division voltage and the oscillation voltage is higher, and
   wherein the PWM signal generating circuit is arranged to feed, as the PWM signal, an output signal of the PWM comparator to the control circuit.

3. The motor drive device of claim 2, wherein the oscillator includes:
   a capacitor having a terminal voltage derived as the oscillation voltage;
   a charge current supply portion to supply the capacitor with a charge current in proportion to the first division voltage;
   a first comparator having an output logic that changes according to which of the first division voltage and the terminal voltage of the capacitor is higher;
   a second comparator having an output logic that changes according to which of the terminal voltage of the capacitor and a predetermined reference voltage is higher;
   an RS flip-flop arranged to receive an output signal of the first comparator as a set-input and arranged to receive an output signal of the second comparator as a reset-input; and
   a discharge switch that is connected between one end of the capacitor and a ground terminal, and that is on-off controlled according to an output signal of the RS flip-flop.

4. The motor drive device of claim 2, wherein the oscillator includes:
   a counter for counting clock signals; and
   a digital-analog converter for converting a value counted by the counter into an analog voltage,
   wherein the oscillator is arranged to provide an output of the digital-analog converter as the oscillation voltage, and
   wherein the motor drive device is arranged to apply the first division voltage as a positive power source voltage to the digital-analog converter and to apply a predetermined reference voltage as a negative power source voltage.

5. Electric equipment, comprising:
   a motor; and
   a motor drive device for controlling driving of the motor, wherein the motor drive device is the motor drive device of any one of claims 1 to 4.

* * * * *